May 6, 1930.　　G. H. SCHIEFERSTEIN　　1,757,392
POWER TRANSMISSION
Filed Jan. 26, 1924

Fig 4ª

Inventor.
George H. Schieferstein,
By Henry Cotly atty.

Patented May 6, 1930

1,757,392

UNITED STATES PATENT OFFICE

GEORG HEINRICH SCHIEFERSTEIN, OF BERLIN-CHARLOTTENBURG, GERMANY

POWER TRANSMISSION

Application filed January 26, 1924, Serial No. 688,876, and in Germany January 27, 1923.

It is well known that it is possible to communicate or to transmit from an electrical oscillatory system (a radio-oscillation circuit) electrical effect, and it is necessary that the oscillatory systems (circuits) be coupled by the so-called "loose coupling"; the best efficiency is attained by arranging the coupling in such a manner that a determined amount of energy is communicated or taken out.

The present invention concerns a method of producing oscillatory movement of predetermined amplitude, i. e., to communicate to or to transmit from a mechanical oscillatory system mechanical effect, and here also it is necessary that the mechanical oscillatory system be coupled by a mechanically acting loose coupling. Also here the best efficiency is attained by adjusting the coupling so that it causes the transmission of an amount of energy to or from a mechanical oscillatory system, this amount of energy depending upon two exactly determinable factors of the mechanical oscillatory system.

Referring to the drawings, in which like parts are similarly designated—

Figure 4:
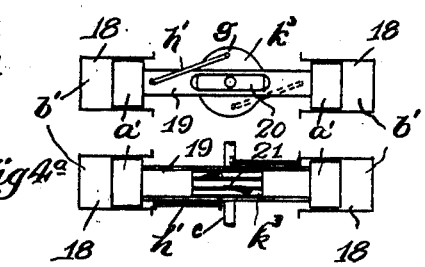

Figs. 4 and 4ª show a different oscillating system in which a one-way coupling device is used.

Figure 5:
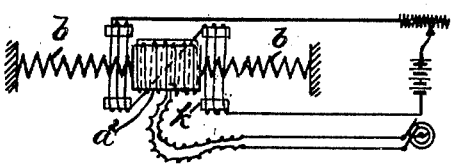

Fig. 5 shows another oscillating system to which the energy is supplied by a variable magnetic field.

Figure 1:
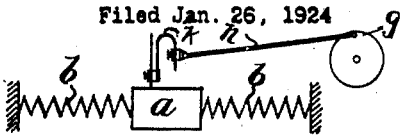
Figure 1 shows an oscillatory system comprising elastic means and a mass operated by a crank and pitman with an interposed elastic adjustable coupling device.
Figure 6:
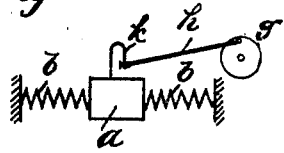

Fig. 6 is similar to Fig. 1 and illustrates the kinetic form of the elastic coupling.

Figure 7:
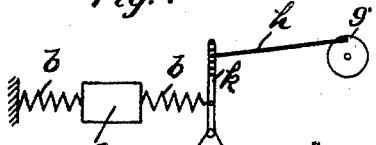

Fig. 7 is a modification of Fig. 1, illustrating the potential form of the elastic coupling.

A mechanical oscillatory set consists (analogous to a radio-set) of—
1. An exciting element;
2. An excited element, and
3. A coupling means or medium.

The elements 1 and 2 are connected by a coupling element 3. One of the two elements, 1 and 2, must be an oscillatory system, i. e., a system adapted to oscillate with its own frequency, though both may so oscillate.

Such a mechanical oscillatory system consists in all cases of a mass and elastic means (for instance, of the mass $a$ and the elastic means $b$ in the schematic Figures 1-5) and it oscillates at its own frequency. The oscillation energy accumulated in such a system changes constantly from the kinetic form $\frac{mV^2}{2}$ (in the middle position of the oscillation) to the potential form $\frac{P^2}{2c}$ (in its end position) and in every moment.

$$\frac{p^2}{2C} + \frac{mv^2}{2} = 1/2\ (cf^2 + mv^2) = \text{constant.}$$

(V and P are maximum values, $v$ and $p$ the momentary values in the velocity of the mass $a$ or of the elastic force of the elastic means $b$, the force of direction of which in a distance of 1 cm. is $c$=the mechanical field resistance, and $f$ is the degree of bending of the elastic means $b$). Whilst in a compulsory reciprocating element with rising resistance and, perhaps, decreasing revolutions, the amount of effect in the element rises and the amplitude remains constant, but in an oscillatory system oscillating at its own frequency the amplitude varies in proportion to the resistance without altering the effect and the number of oscillations.

The variable amplitude, a special characteristic of an oscillatory system, does not permit, for example, a compulsory reciprocating system (with constant amplitude) to be connected by pitman or other stiff means with an oscillatory system (having variable amplitude). For this it is necessary to apply special means which allow transmission of energy to, or the taking of energy from an oscillatory system while it is oscillating and without disturbing the oscillation itself, and the method of doing this consists in transmitting energy to, or taking energy from the oscillatory system of a predetermined amount by mechanical or electrical means or mediums adapted to serve as couplings. Only in this manner is it possible to control the application of mechanical oscillatory systems for the purpose of transmitting energy to mechanical apparatus.

All those mechanical devices and mediums that are found advantageous for coupling purposes which are to a certain degree flexible, allow of transmitting energy; for example, an aperiodically resilient operating device, (spring, air-cushion, rubber,) inserted between an oscillatory system consisting in all figures of weights or masses $a$, $a$, suspended between two elastic means (coil springs, air cushions) $b$ $b$. In Fig. 1 the mass $a$ has a vertical rod, to which is connected by an adjustable connection, an inverted U-shaped spring $k$ to which the end of the pitman is adjustably connected.

Figure 2:
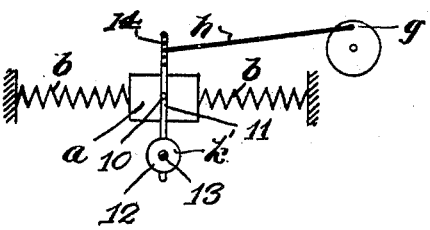
Fig. 2 illustrates a similar system in which the coupling device consists of a pendulum.

Furthermore, a coupling effect may be obtained by a mass on a lever, using its momentum. This arrangement is shown in Fig. 2, in which $a$ is the weight or mass, as before, $b$ $b$ the horizontally disposed alined coil springs between which the mass is supported. Pivoted to the mass or weight at 10 is a lever 11 having a bob 12 adjustably connected to the lever by a screw 13, and this device constitutes the loose or yieldable coupling $k'$ between the driven member or weight $a$ and the mechanical driving mechanism or crank $g$ and the pitman $h$. The upper end of the lever 11 above its pivot 10 is provided with a series of holes 14, in any one of which the end of the pitman may be secured. In order to adjust the energy in-put to the oscillating system $a$ $b$, the bob 12 may be raised or lowered, and the point of connection of the pitman with the lever 11 can be changed.

Furthermore, friction devices of sufficient flexibility may also be used.

Figure 3:
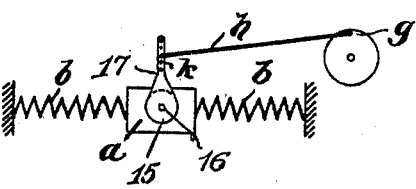
Fig. 3 is a similar system in which the coupling device comprises a friction member.

In Fig. 3 I have shown an oscillating system $a$ $b$ as before, with a friction device comprising a friction disc 15 pivoted at 16 to the weight $a$ and having a lever extension 17 provided with a series of holes, as in Fig. 2, in which the end of the pitman $h$ is connected.

Furthermore, one-way clutch devices, such as ratchets, coaster clutches, band brakes and the like may be used, for example in the manner of mechanical devices operating similarly to a valve, which are connected with and act only during a small part of a half period on the oscillatory system, and thereafter become automatically disconnected, so far as energy transmission is concerned.

In Figs. 4 and 4ª I have shown two alined cylinders 18, in which the oscillating masses $a'$ fashioned as pistons operate against the elastic air or gas cushions $b'$ between the pistons and cylinder heads.

The pistons $a'$ $a'$ are rigidly connected together by rods 19 provided with slots 20 through which passes the shaft $c$ to be driven. The slots 20 permit the rods 19 to reciprocate with respect to the shaft. Between the rods 19 are mounted three discs $k^3$ the middle one being rigidly connected to the shaft $c$ and the two outer discs being loose on the shaft $c$. The outer discs are each connected to a rod 19 by a connecting rod $h$. Between the outer discs and the middle disc I provide a well known type of one-way clutch 21, namely a ball clutch, that permits the middle disc to be driven in one direction only. The piston masses $a$, $a$, are the driving means and move as a unit by reason of the rods 19 connecting them. These rods are connected by the connecting rods $h$ to the loose outer clutch discs $k$ which oscillate and alternately clutch the middle disc secured to the driven shaft $c$ to drive the middle disc in one direction.

Finally, electric, magnetic and electromagnetic fields are applicable for coupling.

In Fig. 5 I have shown an armature constituting the mass $a$ suspended between springs $b$ and between field magnets energized from a source of constant current, there being a regulating resistance interposed in the field circuit. The armature is excited by alternating current.

Generally speaking five kinds of coupling have proven available:
 1. The elastic coupling.
 2. Mass and momentum coupling.
 3. Friction coupling.
 4. Intermittently operating clutches.
 5. Electric or magnetic coupling of mechanical elements.

The coupling methods enumerated may be divided with regard to their manner of application (see Figs. 6 and 7) into—
 1. Kinetic couplings.
 2. Potential couplings.

Kinetic couplings where the energy in-put is of small power applied over a large distance as in Fig. 6, and potential coupling where the energy in-put is of large power applied over a small distance to the oscillating system, as in Fig. 7.

Finally, it is possible that among the several coupling methods "mixed couplings" also may be used, in which a combination of two or more coupling means is used at the same time.

There are, moreover, a great number of coupling possibilities, which consist in the application of the several said means or mediums, a rather unlimited combination possibility, so that all of the several examples of application, some of which are shown schematically in Figs. 1 to 7, are too numerous to be illustrated.

It is known that unintentional oscillations occur by reason of the effect of mass or of momentum, by magnetical influence, and the like, which may destroy turbine shafts, steamer shafts, axes of alternating current generators, etc., without there being any coupling device.

I have found by numerous experiments and researches that an oscillatory system which at a certain desired amplitude $2^t$ has a certain determined damping $2\theta$ and for sustaining such amplitude an energy per second must be supplied to the system which is substantially equal to an amount of energy corresponding to $2\theta$ times the total stored energy present at the desired amplitude, but considered as being stored in one second. Or an energy per period must be supplied to the system which is substantially equal to the amount of energy corresponding to $2\theta$ times the total stored energy present at the desired amplitude. If one transmits to an oscillatory system more energy than above noted, the desired or admittable amplitude increases, and the system is in danger of being destroyed. Should the energy transmitted to the system be less than said above amount, the desired amplitude will not be attained.

$$\frac{\text{The energy communicated per period}}{\text{The total stored energy of the oscillatory system.}} = \text{double the logarithmic decrement of the damping coefficient.}$$

Because the logarithmic damping decrement is a small fraction, the energy transmitted per oscillation or per second is always only a small part of the total oscillating energy present in the oscillatory system.

It is known that in radio two circuits must be tuned if energy is to be transmitted from one to the other. The same has to be done when using two connected oscillatory systems, or when using one and a prime motion producing system.

The regulation of the quantity or transmitted amount of energy is effected by dimensioning, adjusting or setting the mechanical or electrical coupling means or medium used, i. e., elasticity, mass, length of lever arm, gas pressure, current, field, etc., before or during operation. Such adjustability is shown in the figures of drawing, and hereinbefore described.

It will thus be seen that the driven mass, whether it be a weight for doing work or a shaft that is rotated and from which power is taken, need not be operated in synchronism to the main operating crank $g$, the mass being free to exceed or fall short of the path of movement determined by the crank according to momentary demands upon the mechanism, so that the power transmitted from the actuating power system to the oscillating or reciprocating system will be equal, for each period of oscillation, to the product of the oscillating energy of the oscillating system multiplied by double the logarithmic decrement of the damping co-efficient of said system.

This energy is preferably applied at or near the centre of mass of the oscillating weight and the leverage or the path of movement of the power applied by the actuating means or crank will be adjusted according to circumstances of use.

I claim:—

1. An oscillating system comprising a reciprocable driven means, means to reciprocate the same, at least one of said means being a mass mounted for free oscillation and both means being substantially in tune, and a yielding connection between said means to energize and maintain the oscillations of the driven means, said yielding connecting means dismensioned to only transfer at each oscillation period an amount of energy equal to the product of the force multiplied by the distance over which the force is applied and only a fraction of the kinetic energy of the oscillating mass.

2. An oscillating system comprising driven means, driving means therefor, at least one of said means including a mass mounted for free oscillation and both means substantially tuned to one another, and a yielding connection between them transferring during each oscillation period an amount of energy such that the ratio of the product of the force and the distance through which it is applied to the kinetic energy of the mass is substantially equal to double the damping decrement 2.

3. An oscillating system comprising driven means, driving means therefor, at least one of said means including a mass mounted for free oscillation, and both means substantially tuned to one another, and a yielding connecting device between them, the point of connection of said device with the driven means moving through the entire path of the driven means and transmitting thereto an amount of energy which divided by the kinetic energy of the mass is about equal to the damping decrement 2.

4. An oscillating system comprising a driven means and a driving means, at least one of said means including a mass mounted for free oscillation and both means substantially tuned to one another, and a yielding resilient connecting device between them, a point of connection of said device partaking of the movement of said mass and transferring thereto sufficient power to maintain the oscillation of the mass, the ratio of the distance of movement of said point of connection to the distance of movement of the mass being about equal to 2.

5. An oscillating system comprising driven means, driving means therefor, at least one of said means including a freely oscillating mass and both means substantially tuned to one another, and a resilient connecting device between them to energize and maintain the oscillations of the driven means, said yielding connecting means dimensioned to only transfer automatically, variable amounts of force over variable distances, the sum of said variable amounts of force being sufficient to maintain the free oscillation of the mass.

6. An oscillating system comprising driven means, driving means therefor, at least one of said means including a mass mounted for free oscillation and both means substantially tuned to one another, and a resilient connecting device between them, said device to energize and maintain the oscillations of the driven means, said yielding connecting means dimensioned to only transfer automatically, an amount of energy at any time during a period of oscillation over any part of the amplitude thereof to maintain the free oscillation of the mass.

7. An oscillating system comprising driven means, driving means therefor, at least one of said means including a mass mounted for free oscillation and both means substantially in tune, and a resilient connecting device between them transferring at each oscillation the amount of energy required to maintain the free oscillation of said mass, which amount of energy is substantially equal to the product of the force and the distance through which it is applied, and means to adjust a point of connection of said means to vary the amount of energy transferred by said device.

8. An oscillating system comprising driven means, driving means therefor, at least one of said means including a mass mounted for free oscillation, both means being substantially in tune, and a yielding connecting device between them transferring at each period of oscillation an amount of energy sufficient to maintain the free oscillation of the mass that is substantially equal to the product of the force and the distance through which it is applied, and means to vary the point of connection of said device with either or both of said means to vary the amount of energy transferred by said device.

In testimony whereof I affix my signature.

GEORG HEINRICH SCHIEFERSTEIN.